United States Patent

[11] 3,549,821

[72] Inventors Matthew P. Langendorf;
Charles L. Ridings, Lexington, Ky.
[21] Appl. No. 737,642
[22] Filed June 17, 1968
[45] Patented Dec. 22, 1970
[73] Assignee International Business Machines Corporation
Armonk, N.Y.
a corporation of New York

[54] TONE ACTUATED DICTATION SYSTEMS WITH VOICE BUFFER
3 Claims, 12 Drawing Figs.

[52] U.S. Cl. .......... 179/100.1, 179/6
[51] Int. Cl. .......... G11b 21/12; H04m 1/64
[50] Field of Search .......... 179/100.1 DR, 6R, 100.1PS, 100.2S, 2R; 340/174.1I

[56] References Cited

UNITED STATES PATENTS

| | | | |
|---|---|---|---|
| 3,436,483 | 4/1969 | Blane | 179/100.1 |
| 3,360,613 | 12/1967 | Cooper | 340/174.1 |
| 2,833,866 | 5/1958 | Esser | 177/100.1 |
| 3,222,460 | 12/1965 | Albanes | 179/100.1 |
| 3,381,276 | 4/1968 | James | 179/2 |
| 3,296,371 | 1/1967 | Fox | 179/1 |

*Primary Examiner*—Bernard Konick
*Assistant Examiner*—Raymond F. Gardillo, Jr.
*Attorneys*—Hanifin and Jancin and D. Kendall Cooper

ABSTRACT: The invention concerns dictation systems having facilities for selectively connecting remote stations to a central recording unit, and recognizing control tones generated at a connected remote station to effect all operations required including recording and playback of audio (voice) signals. The systems include, in several versions, circuits responsive to presence or absence of voice signals to start and stop the recording unit (respectively), an intermediate voice buffer to prevent loss of voice signals during startup time and features circuitry to insure that control tones are recognized properly, but not recorded on the media in the central recording unit.

INVENTORS
MATTHEW P. LANGENDORF
CHARLES L. RIDINGS
BY D. Kendall Cooper
ATTORNEY

TONE ACTUATED DICTATION SYSTEMS WITH VOICE BUFFER

CROSS-REFERENCES TO RELATED PATENT APPLICATIONS

The following patent cases, assigned to the same assignee as the present case, are of interest:

Application Ser. No. 699,259, filed Jan. 19, 1968, entitled "Dictating and Transcribing Apparatus with Automatic and Semi-Automatic Operator-Controlled Facilities," with C. M. Fackler, et al., as inventors.

Application Ser. No. 737,762 filed concurrently herewith, entitled "Tone Elimination System," with M. P. Langendorf, C. L. Ridings and W. H. Sebastian as inventors.

Application Ser. No. 468,304, filed June 30, 1965, entitled "Tone Controlled Apparatus," with M. P. Langendorf, as inventor.

Application Ser. No. 517,653, filed Dec. 30, 1965, Tone now U.S. Pat. No. 3,405,234 entitled "Tone Circuits for Control and Data Signals," with L. E. West, as inventor.

Application Ser. No. 737,643 filed concurrently herewith, now U.S. Pat. No. 3,527,312 entitled "Tone Actuated Dictation System," and having Thomas E. Dooley, as inventor.

BACKGROUND OF INVENTION, INCLUDING FIELD AND PRIOR ART

Tone-actuated dictation systems have been proposed heretofore. Prior systems of this nature are taught in the Langendorf Application Ser. No. 468,304 and West U.S. Pat. No. 3,405,234 referred to in the cross-reference section. However, such systems have not contemplated voice buffer operation and tone control as set forth herein.

SUMMARY OF INVENTION

In accordance with the present invention, facilities are provided in a tone-oriented dictation system to insure the recording of speech signals only on a primary record media while eliminating the recording of control tones thereon. The invention has particular utility in a system with voice buffer option.

OBJECTS

An object of the invention is to provide dictation systems having logic to prevent recording of control signals on a primary record media in a central recorder unit.

Another object of the invention is to provide tone dictation systems with voice buffer option having provision to insure transfer of voice signals only from the buffer to a primary record media while eliminating control tones encountered in the system.

A further object of the invention is to provide tone-oriented dictation systems that accommodate private telephone stations and public telephone stations through a common automatic selection network.

The foregoing and other objects, features, and advantages of the invention will be apparent from the following more particular description of the preferred embodiment of the invention as illustrated in the accompanying drawings.

IN THE DRAWINGS

FIG. 1*a* represents a public switched network for recognizing and handling requests for service from remote dictation stations, and indicating other telephone line conditions.

FIG. 1*b* illustrates a tone actuated central recording unit and related circuits.

FIG. 1*c* represents a voice buffer unit.

FIG. 1*d* shows an automatic selection network for handling connections and signals from public or private telephone stations.

Figures 1A, 2, 3:
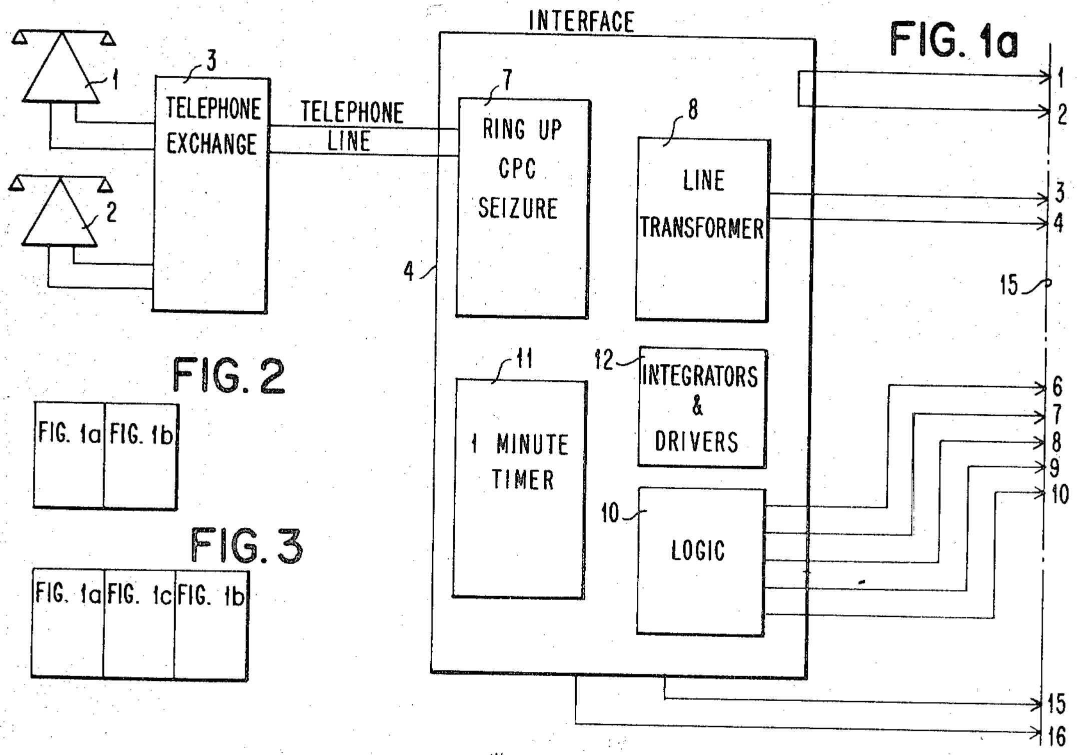
FIGS. 2, 3, 4, 5 illustrate four possible system configurations that make use of the circuits of FIGS. 1*a*—1*d*.
Figure 1B:
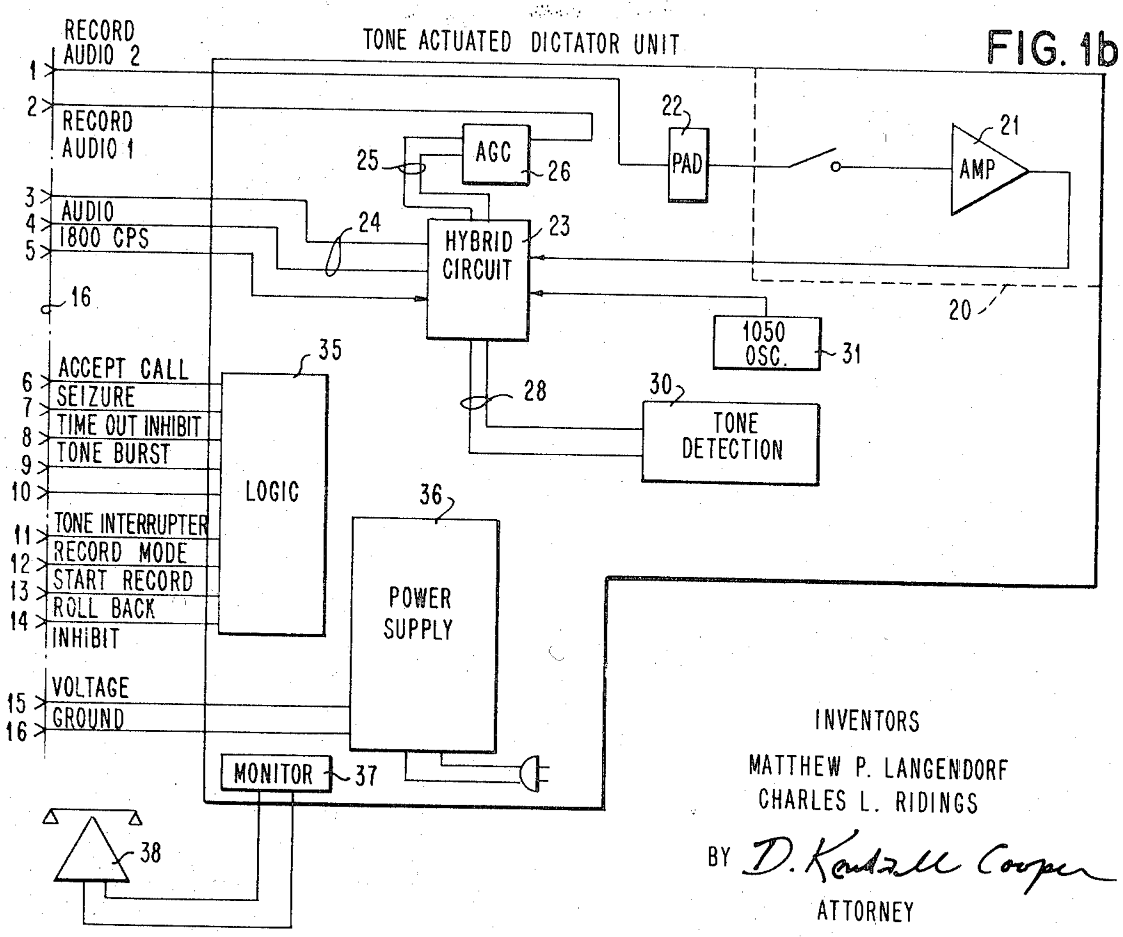
Figure 1C:
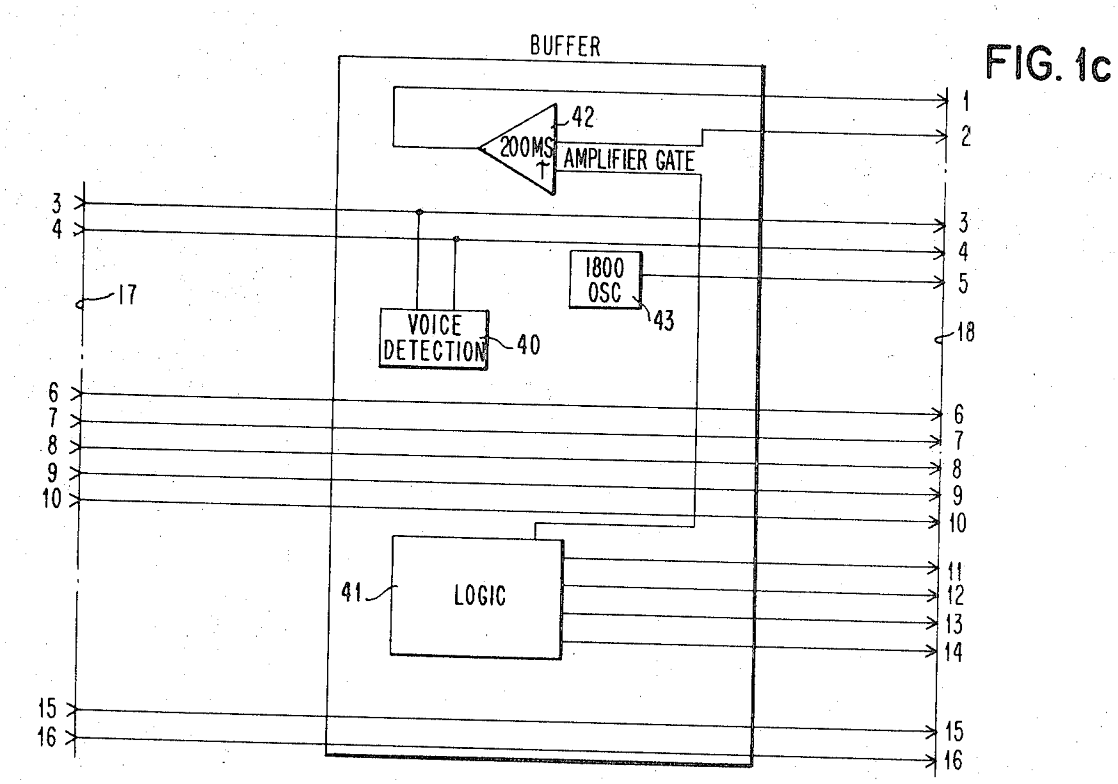
Figures 1D, 4, 5:
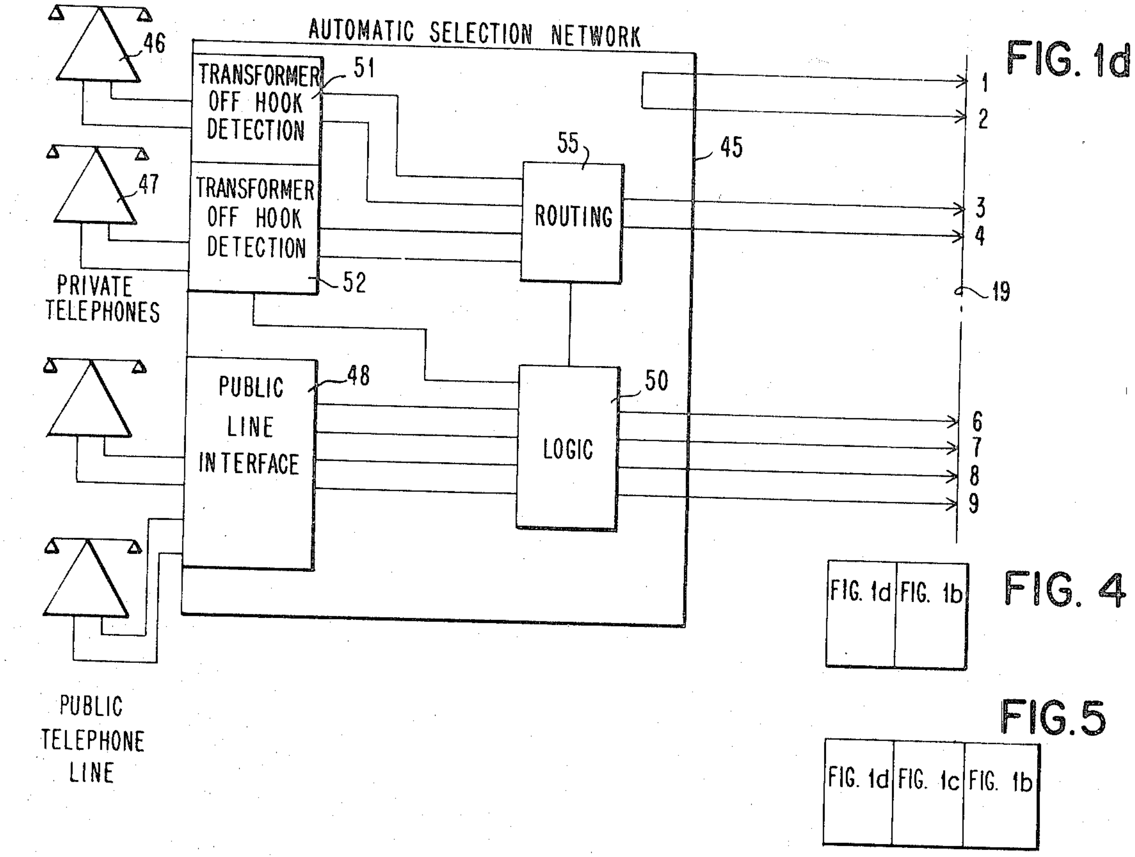
Figure 7A:
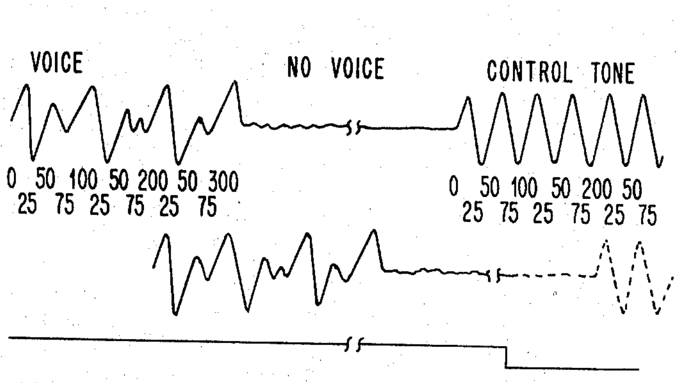
Figure 7B:
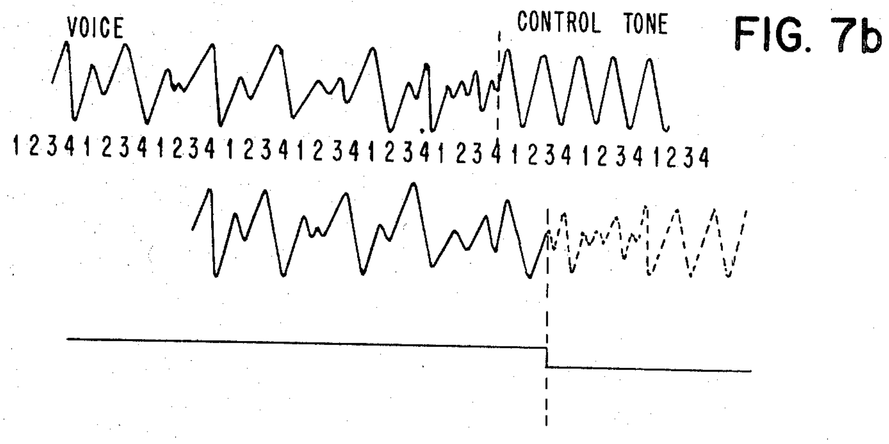

FIGS. 7*a* and 7*b* illustrate voice-tone situations that may be encountered in the voice buffer systems FIGS. 3 and 5).

Figure 8:
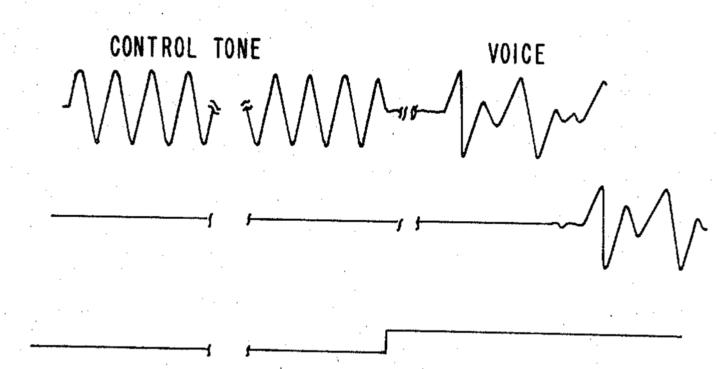

FIG. 8 illustrates a startup condition in the voice buffer systems.

PUBLIC SWITCHED NETWORK

FIGS. 1*a*, 1*b*, 1*c*, and 1*d* represent a variety of telephone and dictation components that are interconnected as illustrated in FIGS. 2, 3, 4, and 5 to form a number of tone-actuated dictation systems.

FIG. 1*a* is a diagram of a typical public switched network that responds to ringing signals, establishes appropriate connections and an audio path from a remote telephone handset to a central recording unit, as well as preforming a number of other functions to be described. The network includes, an example, two telephone handsets 1 and 2 that are assumed to be of the "Touch-Tone"* (*Trademark, American Telephone and Telegraph Company) variety connected to a telephone exchange 3 and further connected to an interface network 4 that includes a number of circuit sections. Circuit 7 responds to ringing currents on the telephone line and establishes a connection through a seizure relay. The circuit also includes various elements concerned with calling party control (CPC). Line transformer 8 provides for DC isolation of the audio signals in order to maintain proper line balance. Logic circuit 10 determines whether the ring-up circuit 7 should respond to incoming calls as, for example, when the central recording unit is not in a ready status, and further establishes disconnect of the system, when appropriate. The 1-minute timer circuit 11 is primarily useful in establishing an automatic disconnect when the calling party' s disconnect cannot be sensed. Circuit 12 includes integrators that translate the relay contact conditions in the ring-up circuit 7 to logic voltage levels, and drivers that furnish driving power for the relays. The various interconnections of the public switched network of FIG. 1*a* terminate along line 15 for connections directly along line 16 with the tone actuated recording unit of FIG. 1*b* as shown in FIG. 2 or along line 17 to the voice operated recorder (VOR) option and buffer unit shown in FIG. 1*c* and then by connections on lines 18 and 16 to the recording unit 1 when arranged as shown in FIG. 3.

TONE-ACTUATED RECORDER UNIT

FIG. 1*b* is a schematic block diagram of a centrally located tone actuated recorder unit having various input and output terminations along line 16. The tone-actuated recording assembly includes a recorder unit 20 having an amplifier 21 that may take a variety of forms and conveniently could be a magnetic belt-type recording unit such as that fully described in the C. M. Fackler, et al., patent application referred to in the cross-reference section. An attenuation pad 22 provides proper voltage levels to the input of recording unit 20.

The central recording assembly further includes a hybrid circuit 23 similar to a four-wire terminating set, as commonly known in the telephone art. Reference is made to the handbook "Reference Data for Radio Engineers" for description of hybrid circuits. Primarily, a circuit os this type is intended to provide separation in order to prevent interference of outgoing audio signals with incoming audio control signals. A two-wire pair 24 accommodates audio signals both incoming and outgoing to the central recording unit. Incoming control signals and audio signals are provided by the two-wire pair 25 to the automatic gain control circuit (AGC) 26 that establishes a path for voice signals to be recorded in the recording unit 20. The path is through the VOR unit in the systems of FIGS. 3 and 5, but directly to the recording unit in the systems of FIGS. 2 and 4. Another two-wire pair 28 connects the hybrid circuit 23 to tone detection circuitry 30 that is more fully described later in the present case. Oscillator circuit 31 provides a 1050-Hertz signal to the dictator indicative of the status of the recording unit at the central station. Logic circuit 35 provides a status recognition for the central recording assembly, proper sequencing of the actions required, and other control functions. The central assembly further includes a power supply 36. A monitor circuit 37 is connected to a local telephone handset 38 for attendant monitoring and conversation with the remotely located dictator. Audio from the handset is routed through the hybrid circuit 23 over the telephone lines. More than one central recording unit with appropriate selecting and connecting facilities can be provided, if desired in order to accommodate more than one dictator concurrently.

VOICE-OPERATED RECORDER (VOR) OPTION OR BUFFER UNIT

FIG. 1*c* illustrates in schematic form a buffer unit that is useful as an option in the systems described herein to establish automatic start-stop control of the central recording unit is response to the presence or absence of voice signals. The buffer unit includes a voice detection circuit 40, a logic circuit 41, a 200-millisecond delay circuit, and an 1800-Hertz oscillator circuit 43.

Voice detection circuit 40 recognizes the presence of audio signals on the incoming telephone lines and provides indications of such presence to the logic circuit 41. Logic circuit 41 incorporates a means for determining the status of the central recording unit, particularly whether it is in the record mode and responds to indications from voice detection circuit 40 to operate the driving means in the central recorder unit, starting and stopping the driving means, as appropriate, during dictation.

The delay unit 42, as known in the art, provides a suitable amount of delay of the audio signals to insure that the recording unit is actually up to proper speed before speech signals are recorded and that speech signals occurring during startup time are not lost.

PRIVATELY WIRED TELEPHONES WITH AUTOMATIC SELECTION NETWORK

Dictators have access to the automatic selection network 45, FIG. 1*d*, and subsequently to the tone actuated dictation machine from either privately wired telephones 46 and 47 or through the public switched network to the public line interface 48. Logic 50, located in the automatic selection network, controls which dictating machine to be accessed and routes the audio from any telephone or public line interface that has requested connection to that dictating machine. The interface to the privately wired telephones is by way of transformer and off-hook detection networks 51 and 52. The off-hook detection networks detect the fact that a dictator has removed the handset from the cradle of the telephone. The transformer in each network provides audio coupling to the tone actuated dictating machine. Power is supplied to the appropriate telephones when they are moved off hook. Logic 50 controls whether or not public line interface 48 accepts a call and allows a connection to be made. The audio for the public line interface is also routed from the connected telephones to the dictating machine that is chosen by the logic. The logic functions include that of determining the proper seizure of recorders in order to accomplish equal use time. Routing circuit 55 interlocks all inputs, whether public line interface or privately wired telephones, and provides driving for reed relays to establish audio paths.

RECORDER LOGIC AND FUNCTIONAL DIAGRAM

Figure 6:
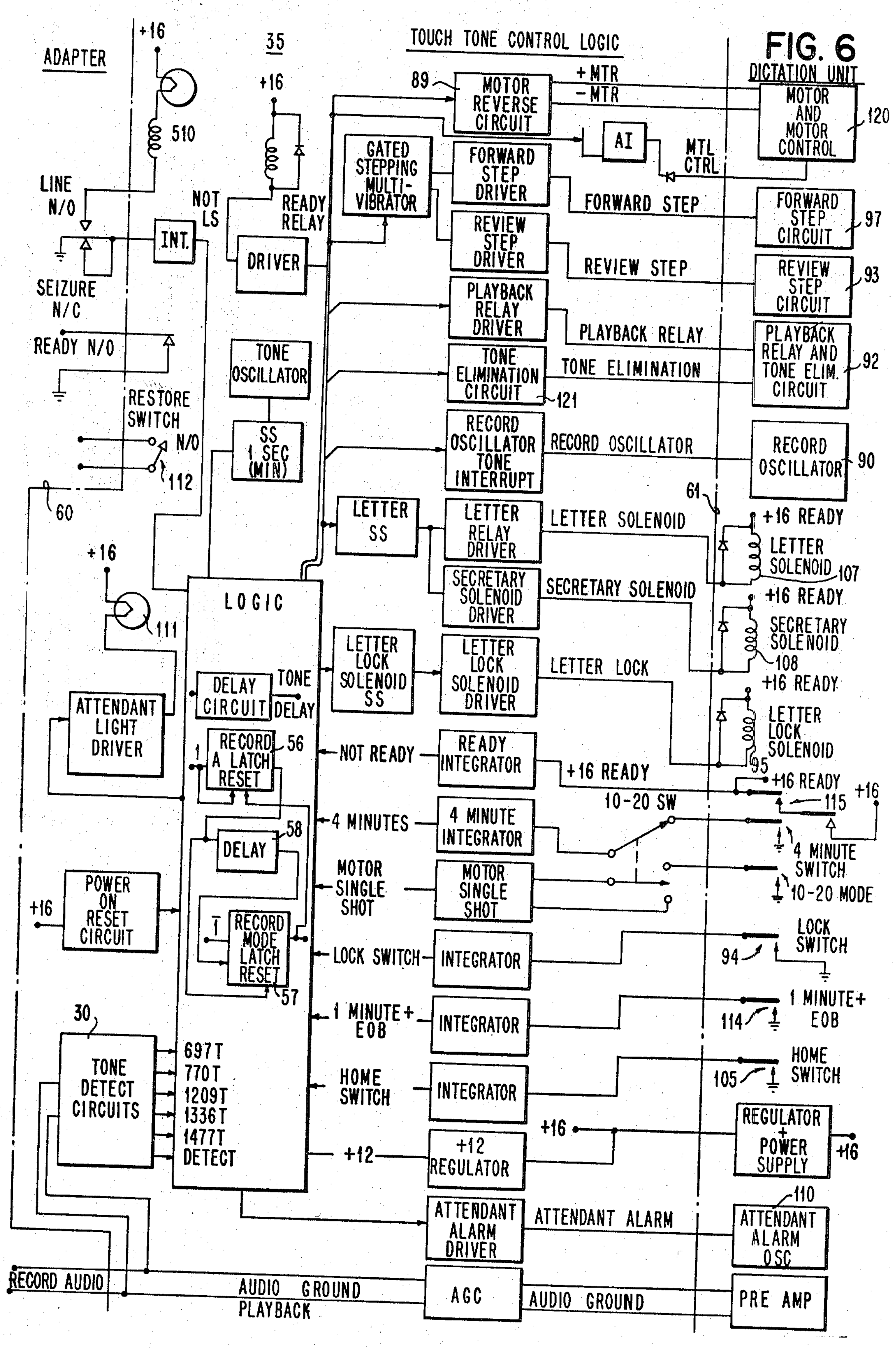
FIG. 6 is a more detailed version of certain logic and control facilities associated with the recorded unit in FIG. 1*b*.

FIG. 6 illustrates various logic more directly associated with the central recording unit and shows a portion of the adapter circuitry to the left of line 60, the touch-tone control and operational logic, and various structures incorporated in the dictation unit itself to the right of line 61. The touch-tone control logic area includes tone detection circuits 30, a number of driver circuits for driving various relays and solenoids in the dictation unit, as well as alarm devices at the central station and integrator circuits associated with certain switch mechanisms. The various operating elements and circuit blocks will be discussed in greater detail in later sections.

FREQUENCY DETECTION NETWORK

Reference is made to the Dooley application for various circuits provided to detect tones encountered during operation of the dictation system. These are included in block 30, FIG. 6.

For purposes of illustration, it is assumed that the touch-tone keyboard on a telephone is arranged in a 4 x 3 matrix with a low band tone associated with a row and a high band tone associated with a column. For the present system, only the first six buttons on the telephone are used which involves two frequencies in the low band and three frequencies in the high band. The low band frequencies are 697 Hz. and 770 Hz. and the high band frequencies are 1209 Hz., 1336 Hz., and 1477 Hz. The detection scheme described in the Dooley case separates two frequencies into the respective bands by using band elimination filters to filter out the unwanted frequency. The outputs of the band elimination filters are fed into respective limiters which generate a constant amplitude square wave at the frequency of the incoming sine wave. The square wave is used to drive series resonate tank circuits which are tuned to the center frequency of the tones present in that band. As the input frequency of the square wave approaches the resonant frequency of a tank circuit, the current through the circuit will increase. When the current reaches a certain threshold value, five related detector-timer circuits give an output. This threshold is related to the percentage deviation of the input frequency with respect to the resonant frequency of the tank circuit. A detector will give an output when the incoming frequency is within a selected range about the resonant frequency and will not give an output when the incoming frequency is greater than a somewhat wider range about the resonant frequency. The detector output will be in the form of pulses which have a period of the incoming frequency. Each detector output is fed into a timer which supplies an output when the string of input pulses is continuous.

The outputs of the five resonant timers are fed into a 60 ms. timer which requires that two frequencies be present simultaneously, one from each band, for a period of 60 ms. in order to get an output. When the 60 ms. timer output comes up the tones that are being detected are considered to be valid tones and are used to perform a particular machine function.

MULTIVIBRATOR CONTROL CIRCUIT

Reference is also made to the Dooley case for a description of a multivibrator control circuit that is incorporated in the logic block of FIG. 6 and that is useful during operation of the system, particularly in connection with the control of the forward and reverse stepping of the magnetic head in relation to the magnetic belt record media and also in connection with the timed or pulsed generation of signals that inform the dictator of various conditions in the system while he is connected to it.

VOR TIMING DIAGRAMS

FIGS. 7*a*, 7*b* and 8 illustrate a number of signal conditions encountered in the system when the VOR buffer unit of FIG. 1*c* is connected for use. These will be described in greater detail subsequently.

PUBLIC SWITCHED NETWORK SYSTEM

FIG. 2 indicates that a public switched network dictation system is established by interconnecting the public switched circuitry of FIG 1*a* directly to the tone actuated dictator unit of FIG. 1*b*.

With this system configuration, a user at one of the telephone handsets 1 or 2 gains connection through the telephone exchange 3 and the interface circuitry and by means of the connections along lines 15 and 16 to the central recording unit 20 and is able to control all of the various operations required in connection with dictation such as recording, playback, stepping, etc. The tone detection circuitry is active in the system of this nature for monitoring and detecting the various tone combinations in order to effect controls desired.

PUBLIC SWITCHED NETWORK WITH VOR OPTION

FIG. 3 illustrates the circuit arrangement necessary to establish a VOR option in connection with the public network system. This arrangement requires that the interface circuitry of FIG. 1*a* be connected into the inputs of the VOR buffer circuit of FIG. 1*c* along lines 15 and 17 and thence along lines 18 and 16 through the inputs of the tone-actuated central dictation unit in FIG. 1*b*.

With VOR option, the starting and stopping of the dictation unit is primarily effected by detection of audio signals encountered when the dictator is speaking. The buffer will also start when control tones are detected but as will be discussed in a later section, such start up of the buffer unit is ineffective to record such tones on the central recording media.

AUTOMATIC SELECTION NETWORK SYSTEM

The automatic selection network system includes the circuitry shown in FIG. 1*d* connected along lines 19 and 16 to the central recording unit of FIG. 1*b* arranged as in FIG. 4. In this case, the automatic selection network permits the connection of either private telephone handsets or public telephone handsets to the central recorded for dictation purposes and control purposes. It is assumed of course that the telephone handsets involved in either case, whether private or public, will have the necessary tone generating structures. Once the connections are established in this system configuration, the recording and playback of material, the generation of tones and their recognition, as well as the necessary controls occur in a manner quite similar to the public switched network system discussed in connection with FIG. 2.

AUTOMATIC SELECTION NETWORK WITH VOR OPTION

FIG. 5 illustrates the necessary circuit connections for the networks shown in FIGS. 1*d*, 1*c*, and 1*b* in order to establish an automatic selection network with VOR option. In this case, the circuits of FIG. 1*d* are connected as inputs to the buffer unit of FIG. 1*c*, along lines 19, 17, the buffer outputs then being directed by connections on lines 18 and 16 to the dictation unit in FIG. 1*b*. A system of this nature has characteristics that are similar to that previously discussed in connection with the public switched network with VOR option.

OPERATIONAL DESCRIPTION

Telephone Line Control

Operation of the system is described in connection with the configuration of FIG. 2 involving FIGS. 1*a* and 1*b*, and in some cases, the VOR configuration of FIG. 3, involving FIGS. 1*a*, 1*c*, and 1*b*. Also, reference is made to FIG. 6.

Interface 4, FIG. 1*a*, automatically answers an incoming call provided the system is in a ready mode. The ready mode is defined as power on, belt loaded and phased (see Fackler, et al. application), and more than 4 minutes of recording time left on the belt. If one of the above conditions is not satisfied, interface 4 and the caller will hear a repeated ringing signal.

When a call is answered, interface 4 gives a signal to the recorder that the connection is made. Depending on the telephone facilities available, this signal may also indicate when the user has hung up. If this feature is available, or if the system has the VOR feature, the recorder will automatically go to the record mode when the connection is established. The recorder may then be used as a message recorder when the user is calling from a nontouch-tone area.

For those cases, where interface 4 does not indicate a hang up, and there is no VOR, the recorder will be in the stop mode when the connection is established. Maintenance of the connection is controlled by a 1 timer. When the recorder (with VOR) is in the stop mode (or in the record mode without being actuated by voice) for a period of 1 minute, the connection is broken by the interface. At this occurrence, the user will hear a one second 1050 Hz. tone, and will not be able to prevent a disconnect.

Feedback Tones

The user hears an interrupted 1050 Hz. stop (stand-by) tone in the stop mode. The VOR feature provides an interrupted "-talk-down" tone (1800 Hz.) when the recorder is in the record mode. This tone is cut off when the user's voice is detected. Once voice is detected, the "talk-down" does not come back for approximately 2 seconds (1—4 seconds), since it is a direct indication that the recorder is in a recording status. Either the talk-down tone or stop tone is an indication that the one minute timer is actively timing out (in those telephone systems that require a time out facility.)

A tone of the same frequency as the stop tone but interrupted at a higher rate is heard by the user when the recorder is in a record mode and there is 1 minute or less recording time remaining on the belt (i.e. 1 minute measured in 10 minute mode.)

Touch-tone Control

Keybuttons 1—6 on the touch-tone pad are used to control the recorder. The touch-tone keyboard is a 4 x 3 matrix with a low band tone associated with a row and a high band tone associated with a column. For the various systems, only the first (6) buttons on the telephone are used. This includes two frequencies in the low band and three in the high band. The low band frequencies are 697 and 770 Hz., and the high band frequencies are 1209, 1336 and 1477 Hz.

a. Digit "1"

Depression of the "1" key on the connected telephone handset 1 or 2 while the recorder is in the stop mode effects a transition to the record mode. Without the VOR, the recorder is then in a record status. With VOR, the user hears a talk-down tone and recording space on the belt is not used until the user begins to speak. At this time his voice is detected in the VOR option of FIG. 1*c*. This causes the recorder to actually begin recording. A buffer in the VOR allows for a finite time for voice detention and starting time for the motor in the dictation unit 20 so there is no loss of the user's dictation.

When in the record mode or the playback mode and the "1" key is depressed, the recorder will go to the stop mode. Since the control tones are audio signals and there is a delay associated with tone detection, the tones are also recorded in the VOR buffer (or on the belt when the feature is not in the system). The time delay in the buffer is used to prevent the tones from being recorded in the central recorder 20. This is accomplished due to the fact that as the tones are detected, no further transfer from the buffer to the recorder is allowed. When the VOR is not in the system, controlled tones are erased from the recorder belt by reversing the motor by circuit 89 with the record oscillator 90, FIG. 6, on as described in the Langendorf application Ser. No. 737,762. This motor reverse and tone elimination sequence is effective whenever the recorder is in the record mode and any digit is received.

The "1" digit is recognized to establish either a record or stop function to insure the transfer from the playback mode to the record mode does not result from a miskeying of the touch-tone phone. This prevents accidental erasure of previous dictation.

b. Digit "2"

Depression of the "2" key causes the recorder to go to the playback mode by actuating relay circuit 92 and backstep by actuating review circuit 93, FIG. 6. The recorder has automatic stepping which is actuated at the rate of from 3—5 steps per second (nominal) while the "2" key is depressed. A "letter end" lockout mechanism, prevents a backstep into a prior user's dictation.

When the "2" key is actuated while the recorder is in the record mode (without VOR) the backstep takes place after the motor has reversed to erase the control tones. Since no motor reversal is required when the "2" key is actuated while the recorder is in the stop mode, it becomes difficult for a user to time the "2" key actuation to get a single backstep. The logic therefore causes at least one backstep for any detectable "2" key actuation, whether or not there is a motor reverse sequence.

c. Digit "3"

Depression of the "3" key causes the recorder to go to the playback mode and forward step under control of circuits 92 and 97, FIG. 6. The characteristics of forward stepping are the same as backstepping except the forward travel is limited to the previously recorded area of the belt. This is controlled by the "home" switch 105 (review-playout contact), FIG 6. Home contact 105 moves forward with the soundhead only when the recorder is in record mode. To insure that the user can playback previous dictation, the home contact kicks forward on each backspace sequence approximately 0.025 inches. This is required as the position of the home contact may be as much as one belt revolution displaced from the end of dictation after a stepping operation.

d. Digit "4"

Depression of the "4" key causes a letter mark to be placed on the index slip (see Fackler, et al. application) and transfers the recorder to the stop mode. The time for which the marking solenoid 107 is actuated is controlled by the logic and is not affected by the duration of the "4" key actuation.

e. Digit "5"

Depression of the "5" key causes a secretary mark to be placed on the index slip by actuation of solenoid 108 and transfers the recorder to the stop mode. The actuation time is again controlled by the logic.

f. Digit "6"

The "6" key is used as an attendant call signal. An audible alarm 110 is activated for the duration of the key depression and the attendant light 111 comes on, and remain on until another key is pressed or a disconnect occurs. The "6" key also causes the recorder to go to the stop mode and each key depression resets the one minute timer 11. There is, therefore, no requirement that the attendant acknowledge the user within 1 minute to prevent a disconnect.

Interrupt

The attendant may interrupt to allow communication with the user via the attendant phone 33, FIG. 1b, either by choice or in answer to the attendant alarm. Actuation of the interrupt switch causes the following:

a. transfers recorder to the stop mode;

b. inhibits the one minute time-out disconnect operation;

c. provides power to the attendant phone to allow two way conversation; and d. allows the attendant to replace the belt without causing a disconnect.

The recorder remains in the interrupted condition until the attendant actuates restore switch 112. The user then hears an interrupted stop tone when the recorder has been restored.

VISUAL AUDIO INDICATORS

| Machine status | In use lite | Attendant lite | Attendant buzzer | Day/ Nite switch |
|---|---|---|---|---|
| Not Seized Ready | OFF | OFF | OFF | |
| Seized | ON | OFF | OFF | |
| Attendant Call: | | | | |
| Hold | ON | ON | ON | |
| Release | ON | ON | OFF | |
| Interrupted | OFF | ON | OFF | DAY. |
| Interrupted or Not Seized and 4 Minute Zone. | OFF | ON | OFF | NITE. |
| Not Seized and 4 Minute Zone | OFF | ON | ON | DAY. |

Disconnect Sequence and Belt Changes

When the interface indicates that the connection has been broken the recorder forward steps to the home contact 105. The letter lock mechanism has been released by solenoid 95 under control of the machine logic and moves forward to the home contact position. At this point, a letter mark is placed on the index slip by actuating solenoid 107. The lock switch on the letter lock mechanism is closed at this time and the recorder again forward steps one or two times until lock switch 94 opens. This operation is made to insure that the next user will be able to playback the first words of his dictation since the lock switch prevents backstepping into a previous user's dictation.

The recorder is now ready to accept the next call providing there is more than 4 minutes of dictation left on the belt as indicated by switch 115. If there is less than 4 minutes left, the recorder indicates this to interface 4 and the interface will not answer. Also, the attendant lamp 111 and buzzer (see table, Day/Night Switch) comes on at the recorder to indicate to the attendant that a belt change is required. Upon dialing the number the caller hears the ringing signal as an indication of this condition.

Contacts 114 indicate one minute of recording time left on the belt and end of belt condition that necessitate changing the belt.

When the attendant does change the belt and the recorder has phased properly, the lock switch will be closed. One or two forward steps are required to open the switch. This again insures that the first user will be able to playback his first word of dictation. When lock switch 94 opens, the recorder is ready to accept the call and indicates this to the interface. A belt change during interrupt is the same except that restore is inhibited until the belt is phased, and lock switch 94 opens.

Motor Reverse Control

As described in the Langendorf, et al. case Ser. No. 737,762, the control tones are erased from the belt under control of circuit 120 by a motor reversal when the recorder is transferred from the record mode to the stop or playback mode. The record time of the tones is determined by the tone circuitry 30. A switch, not shown, but linked to the drive by a slip clutch is opened when the motor drives forward. A digit received by the recorder in the record mode causes the motor voltage to be reversed to circuit 89. The motor accelerates in the reverse direction engaging the slip clutch. When the drive has travelled the preset distance as determined by the switch closure, the motor voltage is again reversed. The motor is dynamically braked and accelerates in a forward direction until the switch opens, at which time either normal forward speed voltage is applied for playback mode or no voltage for stop mode. During the reversal, the record oscillator 90 is kept on in order to erase the control tones.

Audio

The bidirectional audio path of the telephone line is split into two unidirectional paths in the recorder by hybrid circuit 23, FIG. 1*b*. The audio input path connects to the AGC circuit 26 and the tone detection circuitry 30 in parallel, while the audio output path connects to the amplifier 21. The electrical separation of the unidirectional paths provided by the hybrid circuit is inherently limited by the ability (or inability) to match the impedance of randomly selected telephone lines. The amount of separation affects the capability of the tone detect circuit when the recorder is in the playback mode; however, speech pauses are generally sufficient to allow adequate tone control in the worst case. Separation also determines the degree to which a feedback tone present in the last minute of recording time is recorded.

The purpose of AGC circuit 26 is to maintain the recording level at reasonable limits when there are variations of input levels due to the ability of the system to handle calls on local as well as long distance connections. There is no AGC for the tone detection circuit.

Control Tone Conditions and Handling with VOR Option

FIGS. 7*a*, 7*b*, and 8 illustrate a number of control tone conditions encountered when the system is equipped with the VOR option as previously discussed in connection with FIGS. 3 and 5. FIG. 7*a* represents normal usage whenever the recorder is in a record mode and receives a control tone which transfers it to some other mode such as a stop mode or playback mode. The FIG. illustrates both voice and control tone signals under these circumstances. It also indicates that there is a delay of approximately 200 milliseconds of time provided by the voice buffer 42, FIG. 1*c*. The first wave form is an illustration of a typical voice signal being fed into the buffer 42 and voice detection circuitry 40 from the telephone line. The output of the buffer is illustrated in the second line of signals. FIG. 7*a* illustrates the condition where the dictator has finished speaking and then activates a control button to take the machine out of the record mode. This is illustrated as the control tone in the first line of signals. It should be noted that shortly after the control tone appears, it is detected in the tone detection network 30 and immediately fed into logic circuitry 41 which degates the output amplifier of the buffer, inhibiting it from being recorded onto the belt of the recording machine.

FIG. 7*b* reflects a situation in which the dictator is speaking at the time he initiates a control tone from a button that will take the machine out of the record mode. It simply illustrates the fact that in this situation a portion of the voice will be lost corresponding to the delay time minus the time it takes to detect the control tone.

Under such circumstances, approximately 100—150 milliseconds of voice signal is not recorded on the central recording media and thereby not subsequently available for playback. The effect of this on the recorded signal will vary depending upon what the voice signal involved. Under most circumstances, such loss is not of any particular consequence. FIG. 7*b* is provided to illustrate the foregoing condition and to further show that the control tone is not recorded on the main record media, as was also the case in FIG. 7*a*. FIG. 8 illustrates a situation where the machine is in a stop mode and the control signal is received in order to place it in the record mode. The controlling sine waves which appear at the tone detection network also appear at the input to the buffer 42. However, the logic is such that the amplifier to the input of the buffer is not gated on until the machines is actually placed in a record mode. This occurs at the termination of the control tone which is being received. Therefore, none of the control tone is placed onto the buffer and none of it will be placed on the belt in the recorder. The logic in FIG. 6 includes a record A latch 56 and a record mode latch 57. The record A latch is set upon occurrence of the control tone "1". The output of this latch through delay circuit 58, together with a not "1" condition is effective to then set the record mode latch 57 upon termination of the control tone "1" signal.

While the invention has been particularly shown and described with reference to several preferred embodiments, it will be understood by those skilled in the art that various changes in form and detail may be made without departure from the spirit and scope of the invention.

We claim:

1. A dictation system, comprising:

a recorder unit having facilities for performing customary dictation operations, including establishment of a stop mode, a record mode and a playback mode, in response to received tone signals to record on and reproduce signals from a primary media;

a remote station with control adjuncts for generating distinctive control tone signals and audio signals;

means for interconnecting said recorder unit and said station;

a voice buffer interconnected intermediate said station and said recorder unit said voice buffer including buffer recording means for receiving tone signals and audio signals from said remote station and recording said signals in said buffer, and buffer playback means for reproducing tone signals and audio signals in said buffer to supply said reproduced signals to said recorder unit;

tone occurrence means in said recorder unit for recognizing occurrence of a particular tone indicative of change in mode to only store such occurrence without activating said recorder unit, said occurrence means providing an occurrence control signal indicative of such occurrence;

tone termination means for recognizing termination of said particular tone and generating a termination control signal indicative of such termination; and activating means responsive to said occurrence control signal and said termination control signal to initiate the required change in mode of said recorder unit from stop mode to record mode, thereby precluding any recording of said particular tone on said primary media.

2. The system of claim 1, wherein:

said occurrence means comprises a first latch to store occurrence of said particular tone, and a delay means for providing a delayed version of said tone, and wherein said activating means comprises a second latch settable by output of said delay means and a signal indicative of termination of said particular tone.

3. The system of claim 1, further comprising:

amplifier means in said buffer; and means for degating said amplifier means upon occurrence of another tone indicative of a change in mode from record mode to another mode such as stop mode or playback mode, in order to prevent recording of said control tone on said primary media.